United States Patent

Maynard

[15] 3,707,015
[45] Dec. 26, 1972

[54] DETACHABLE HANDLE ASSEMBLY FOR COOKING UTENSILS

[72] Inventor: Edmund M. Maynard, Santa Monica, Calif.

[73] Assignee: Gaydell, Inc., Santa Monica, Calif.

[22] Filed: Dec. 23, 1970

[21] Appl. No.: 100,925

[52] U.S. Cl. .................................................. 16/114
[51] Int. Cl. ............................................ A47b 95/02
[58] Field of Search ............................... 16/110, 114

[56] References Cited

UNITED STATES PATENTS

| | | | |
|---|---|---|---|
| 3,334,782 | 8/1967 | Friberg | 16/114 A |
| 3,420,401 | 1/1969 | Maslow | 16/114 A |

Primary Examiner—Bobby R. Gay
Assistant Examiner—Doris L. Troutman
Attorney—Ralph F. Crandell

[57] ABSTRACT

A detachable handle for cooking utensils in which the handle may take the form of a thermometer for indicating the cooking temperature in the interior of the utensil. Two exemplary forms of mounting clips for detachably securing a handle having an elongate tubular stem to a pot or wire mesh deep fry basket are disclosed. The elongate tubular stem is formed with a pair of radially projecting axially extending ribs near its distal end which cooperate with the mounting clip to resiliently retain the handle in a fixed relationship to the utensil. The stem preferably takes the form of the temperature sensing probe of a thermometer which carries a scale at the upper end of the handle.

9 Claims, 13 Drawing Figures

PATENTED DEC 26 1972
3,707,015
SHEET 1 OF 2
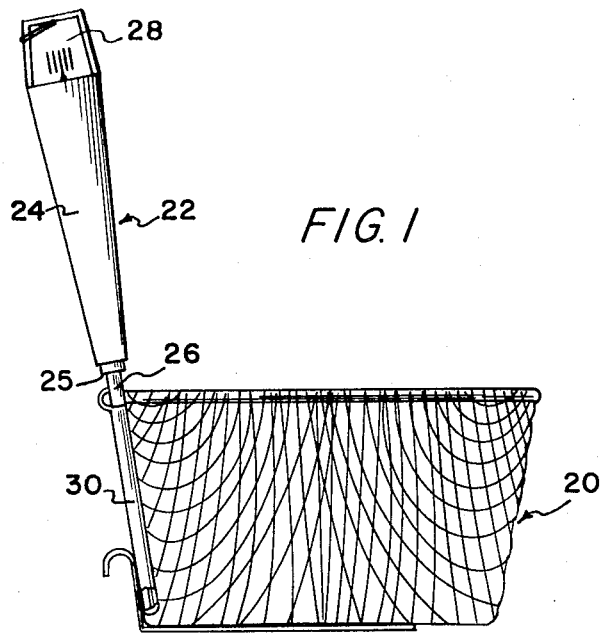
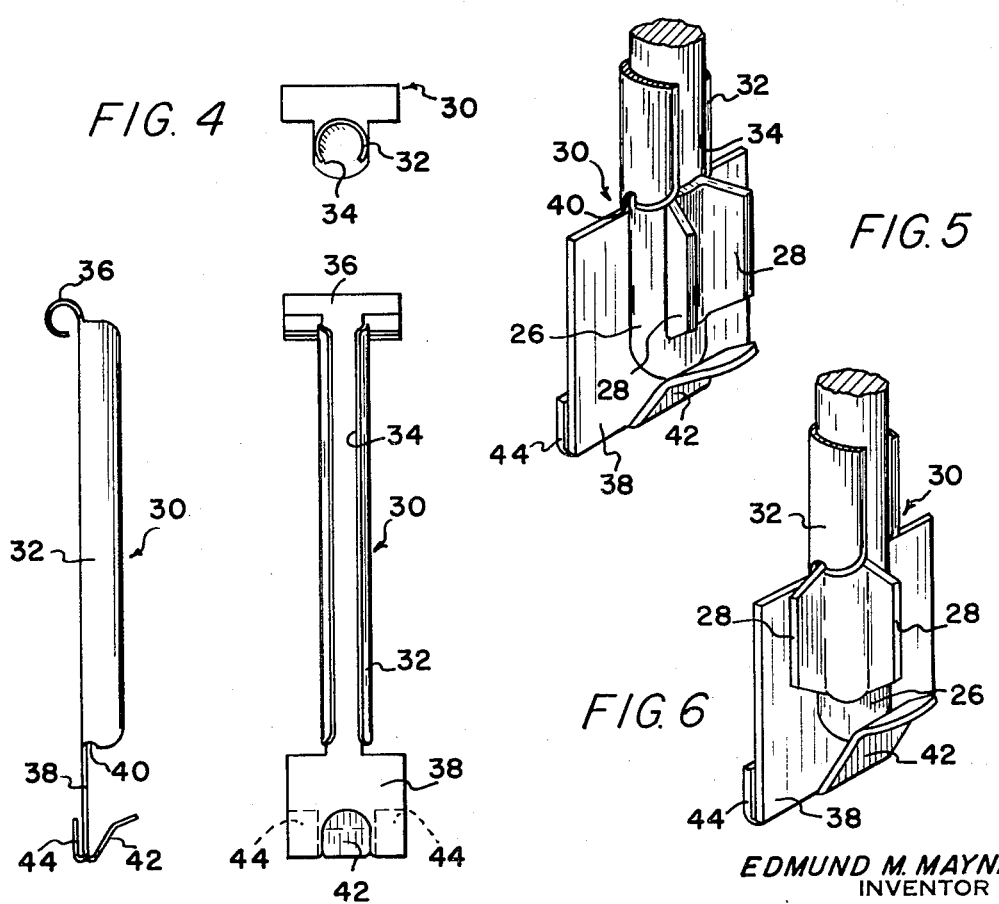
EDMUND M. MAYNARD
INVENTOR
BY Drake + Crandell
ATTORNEYS

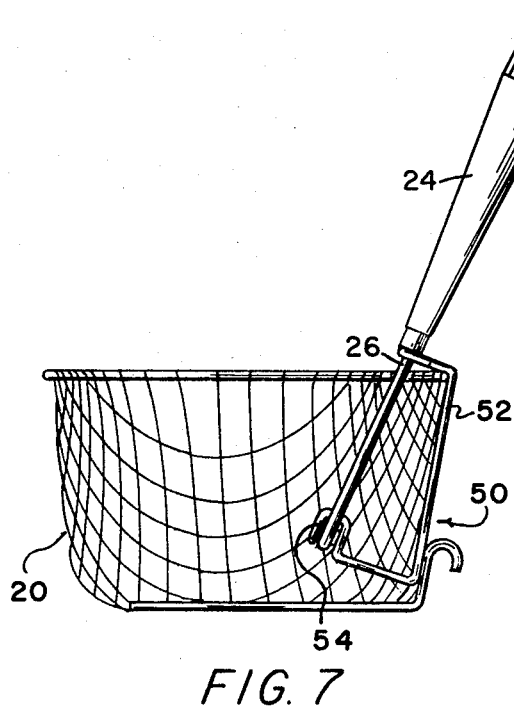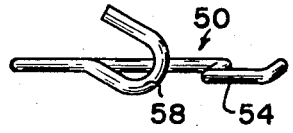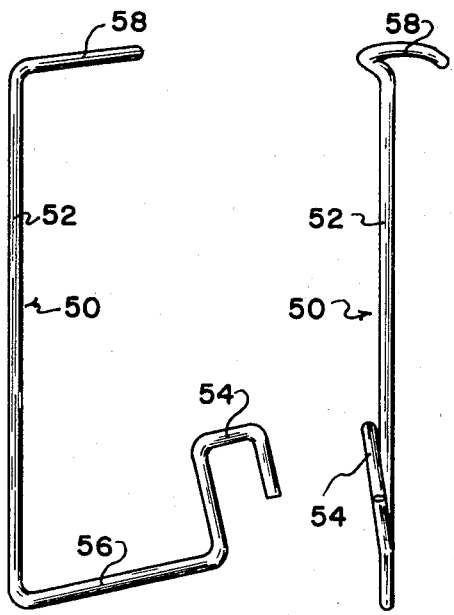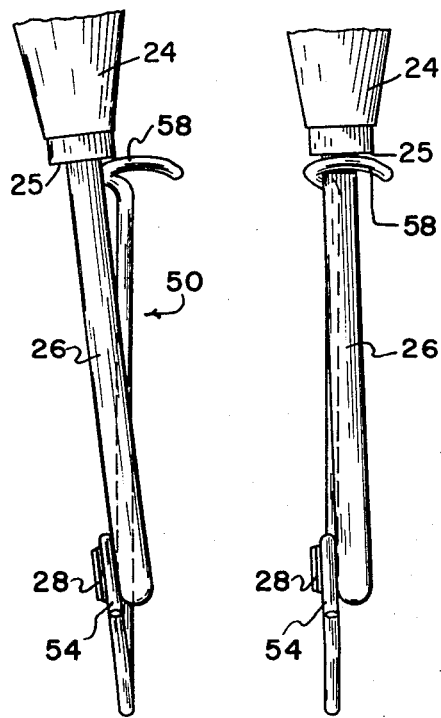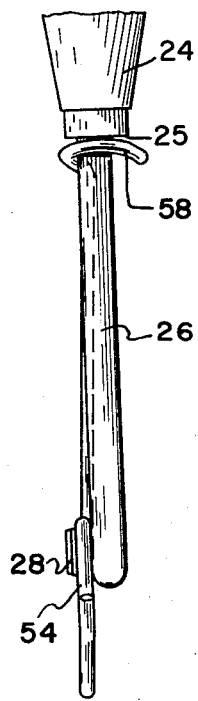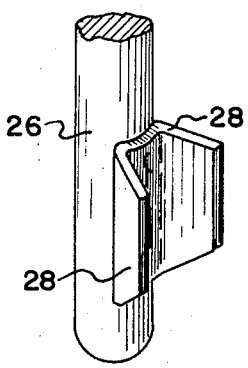

DETACHABLE HANDLE ASSEMBLY FOR COOKING UTENSILS

RELATED PATENTS

The temperature indicating handle may take the form of that shown in U.S. Pat. No. 3,277,714.

BACKGROUND OF THE INVENTION

In many recipes it is desired to maintain a cooking temperature with a degree of precision greater than that which can be achieved by setting the heating element to a selected one of a limited number of settings. While the settings of the heating element give an approximate indication of the temperature of the heating element, the cook is not so much concerned with the heating element temperature, but rather is concerned with the actual temperature of the ingredients which are being heated. This temperature can be determined acurately only by a direct measurement of the ingredients within the utensil because the ingredient temperature will always be at a temperature less than that of the heating element until it has been heated for a period of time sufficient to reach equilibrium. Manual insertion of a thermometer into the ingredients being cooked is usually inconvenient and frequently uncomfortable while the provision of a permanently mounted thermometer on the utensil is economically impractical. It is therefore a major object of the present invention to provide structure for detachably mounting a thermometer on a cooking utensil in a manner such that the thermometer can also serve as a detachable handle which can be readily shifted from utensil to utensil as required.

SUMMARY OF THE INVENTION

The present invention is specifically concerned with mounting clip structures which may be readily attached to a cooking utensil to enable a handle incorporating a thermometer of the type disclosed in U.S. Pat. No. 3,277,714 to be detachably secured to the utensil with the temperature sensing probe maintained in the region occupied by the contents of the utensil. The thermometer of U.S. Pat. No. 3,277,714 consists of a handle from which an elongate stem-like temperature sensing probe projects. A pair of axially extending radially projecting ribs are fixed to the probe near the end remote from the handle. The mounting clips, both forms of which are secured to a side wall of the utensil, engage the ribs to lock the stem against rotation relative to the mounting clips. In a sheet metal form of clip, the stem is received within a sleeve which restrains the stem against lateral movement relative to the clip and a resilient lip engages the end of the stem to resiliently maintain the ribs of the stem seated in a slot at one end of the sleeve. In a bent wire form of the clip, a U-shaped section of the bent wire is seated against the back of the ribs and the front of the stem and resiliently biases the upper end of the stem into the bight of a second U-shaped portion of the bent wire. In this latter form, the second U-shaped portion of the wire is engaged beneath the lower end of the handle to prevent axial withdrawal of the ribs from engagement with the U-shaped portion at the lower end of the clip.

Other features and advantages of the invention will become apparent by reference to the following specification and to the drawings.

In the drawings:

FIG. 1 is a side elevational view showing a deep fry basket having one form of mounting clip;

FIG. 2 is a side elevational view of the mounting clip employed in FIG. 1;

FIG. 3 is a front elevational view of the clip of FIG. 1;

FIG. 4 is a top plan view of the clip of FIG. 1;

FIG. 5 is a detail perspective view showing the lower end of the clip of FIG. 1 and the temperature sensing probe in a state of partial engagement with the clip;

FIG. 6 is a perspective view similar to FIG. 5 showing the lower end of the probe fully seated in the clip;

FIG. 7 is a side elevational view of a deep fry basket employing a second form of mounting clip embodying the invention;

FIG. 8 is a side elevational view of the clip of FIG. 7;

FIG. 9 is a front elevational view of the clip of FIG. 7;

FIG. 10 is a top plan view of the clip of FIG. 7;

FIG. 11 shows the temperature sensing probe partially engaged with the clip of FIG. 7;

FIG. 12 is a view similar to FIG. 11 showing the probe fully engaged in the clip;

FIG. 13 is a detail perspective view of the lower end of the temperature sensing probe showing the rib structure.

In FIG. 1, one form of the invention is disclosed as being applied to a wire mesh deep fry basket designated generally 20 to detachably mount a temperature sensing probe designated generally at 22, such as a probe of the type disclosed in U.S. Pat. No. 3,277,714, on basket 20. Structural details of probe 22 are set forth in detail in the aforementioned patent; for the purposes of the present invention it is sufficient to note that the probe includes a handle portion 24 from which projects an elongate tubular stem 26. The handle defines a shoulder adjacent the stem 26. Stem 26 carries the thermally responsive elements of the thermometer while the sensed temperature is indicated by a rotatable scale 28 mounted in the upper end of handle 24. As best seen in FIGS. 5, 6, and 13, a pair of axially extending radially projecting ribs 28 are fixedly mounted near the lower or distal end of stem 26.

In the embodiment of FIGS. 1–6, probe 22 is detachably mounted on basket 20 by a clip designated generally 30 which is constructed from a unitary piece of sheet metal material. In use, clip 30 is permanently secured to basket 20, however, its structure is best seen in FIGS. 2–4 in which the clip per se is shown. Clip 30 is constructed with an elongate stem section 32 which, as best seen in the plan view of FIG. 4 is rolled into a hollow sleeve-like configuration which is dimensioned to slidably receive stem 26 of probe 22. A slot 34 which extends the entire axial length of sleeve 32 provides a clearance path for ribs 28 as stem 26 is slid through sleeve 32. At the upper end of sleeve 32, a rolled flange 36 is formed to facilitate the clamping of this end of clip 30 to the rim of basket 20.

At the lower end of clip 30, a flat tab 38 projects downwardly and outwardly from opposite sides of sleeve 32. Notches 40 extend axially upwardly into the wall of sleeve 32 at each side of the sleeve adjacent the juncture of the lower end of the sleeve with tab 38. At the lower end of tab 38 an upwardly and forwardly inclined resilient lip projects from tab 38 in axial alignment with sleeve 32. Rearwardly and upwardly bent mounting tabs 44 may be formed on tab 38 to clamp the lower end of clip 30 to the wire mesh of basket 20.

In use, clip 32 is fixedly secured in a vertically extending position along the wall of basket 20 either by mounting flange 36 and tabs 44 or, in the case of an imperforate walled utensil, by spot welding. Probe 22 is mounted in the clip by passing the stem of the probe downwardly through the interior of sleeve 32, slot 34 accommodating passage of the radially projecting ribs 28. When the probe is inserted into the clip to a point where ribs 28 pass beyond the lower end of sleeve 32, the probe is rotated in either direction, to bring one of ribs 28 into engagement with tab 38 and at the same time to axially align the upper edge of the rib with notch 40. The upward inclination of lip 42 is such that before the ribs can be cleared below the lower end of slot 34, lip 42 must be resiliently deflected downwardly, and when the rib is rotated into alignment with one of the notches 40, the resilient action of lip 42 forces the probe upwardly to seat the upper edge of rib 28 in notch 40. This action locks the probe against rotation within sleeve 32 while at the same time lip 42 resiliently maintains the rib seated in notch 40, thereby restraining the probe against axial movement within sleeve 32. Sleeve 32 partially surrounds the stem 26 of probe 22 and thereby restrains the probe against lateral displacement relative to the mounting clip.

In FIGS. 7–12 a modified form of clip 50 is shown in which the clip is formed from a length of wire. The modified form of clip 50, like the previously described embodiment, is fixedly secured to a utensil which again takes the form of a wire mesh basket. The structure of clip 50 is best seen in FIGS. 8–10 which show the clip per se as including an elongate stem or body section 52. At the lower end of body section 52, a first U-shaped portion 54 is formed in the length of wire with the open end of the U facing downwardly and portion 54 being laterally offset from body section 52 by an integral intermediate connecting section 56. As best seen in the front view of FIG. 9, U-shaped portion 54 lies in a general plane which is inclined with respect to the longitudinal extent of body section 52.

At the upper end of body section 52, a second U-shaped portion 58 lies in a horizontal general plane.

Referring now to FIGS. 11 and 12, the dimensions of the lower U-shaped portion 54 are such that its legs can pass rearwardly behind ribs 28 on probe 22 with the bight of U-shaped portion 54 passing across and in front of the probe stem 26. As indicated in FIG. 11, when the ribs are so seated within U-shaped portion 54 stem 26 is inclined to a position such that the upper end of stem 26 is laterally displaced from the upper U-shaped portion 58. The stem is then moved to place it within U-shaped portion 58, this movement of the stem being resiliently resisted by the lower portion of the clip because it applies a torsion force to intermediate connecting section 56. The angular relationship between U-shaped portion 54 and 58 is such that when stem 26 is located in alignment with the open end of upper U-shaped portion 58, the stem is resiliently urged into the U-shaped portion 58. The spacing between the U-shaped portions is selected to be such that when ribs 28 are fully seated within lower U-shaped portion 54, the probe must be lifted slightly so that its handle will pass above upper U-shaped portion 58, this action being resiliently resisted by a longitudinal bending moment on intermediate connecting portion 56. Thus, when the probe is finally seated, rotation of the probe is resisted by the engagement between ribs 28 and the legs of lower U-shaped portion 54 while axial displacement of the probe is resisted by the bight of U-shaped portion 54 against the rib edges combined with the engagement of upper U-shaped portion 58 beneath the handle shoulder 25 of the probe as shown in FIG. 12. Lateral movement of the probe is resisted by the two point support provided by U-shaped portions 54 and 58. Clip 50 is fixedly secured to the utensil by spot welding.

While two embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. For use in combination with a handle having an elongate tubular stem projecting from one end thereof, said stem having a pair of axially extending ribs fixedly secured to and projecting radially therefrom adjacent the end thereof opposite from said handle; a one-piece clip adapted to be mounted upon a cooking utensil for detachably mounting said handle thereon and comprising an elongate body section, retainer means integrally formed at one end of said body section engageable with at least one of the ribs on said stem for releasably locking said stem and handle against rotation relative to said clip, stem engaging means integrally formed on said body section and spaced from said retainer means for at least partially surrounding said stem at a location displaced axially along said stem from said retainer means for restraining said stem against transverse displacement relative to said clip, said retainer means including a portion cooperating with at least one of said ribs for restraining said handle and stem against axial displacement in at least one direction relative to said clip when said ribs are engaged by said retainer means.

2. A clip as defined in claim 1 wherein said clip is formed from sheet metal, said body section comprising a hollow sleeve adapted to slidably receive said stem and having a slot extending the entire length of said sleeve to accommodate passage of said ribs when said stem is axially advanced through said sleeve, said retainer means comprising a rib receiving notch extending axially into said sleeve at one end thereof in circumferentially spaced relationship from said slot.

3. A clip as defined in claim 2 including a resilient lip integral with said body section adjacent to and spaced from said one end of said sleeve engageable with said one end of said stem to resiliently bias said stem axially in a direction seating a rib on said stem in said rib receiving notch.

4. A clip as defined in claim 3 further comprising a tab section integral with and projecting from said one end of said sleeve and extending outwardly with respect to opposite sides of said sleeve, said notch extending into said sleeve adjacent the juncture of said sleeve and said tab section whereby said rib is engaged with said tab when said rib is seated in said notch, said lip being integral with said tab at the end of said tab remote from said sleeve.

5. A clip as defined in claim 1 wherein said clip is formed from a length of wire with said body section comprising a generally vertically disposed intermediate section of said length of wire having said retainer means at its lower end and said stem engaging means at its upper end, said retainer means comprising a downwardly opening first U-shaped section integral with and laterally offset from said body section and proportioned to seat the legs of said first U-shaped sections respectively against the backs of said ribs with the back of said first U-shaped section seated against the front of said stem, said stem engaging means comprising a second U-shaped section integral with said body section, said first U-shaped section lying in a general plane offset with respect to that of said second U-shaped section to resiliently bias said stem against the bight of said second U-shaped section when said stem and ribs are seated in said first U-shaped section.

6. A clip as defined in claim 5 wherein the spacing between said first U-shaped section and said second U-shaped section is such that said second U-shaped section can be engaged with said stem only when said ribs are fully seated in said first U-shaped section.

7. For use in combination with a handle having an elongate tubular stem projecting from end thereof, said stem having a diameter smaller than the diameter of said handle and including a pair of axially extending ribs fixedly secured to and projecting radially therefrom adjacent the end thereof opposite from said handle; said handle defining a shoulder adjacent said stem; a one piece bent-wire clip adapted to be mounted upon a cooking utensil for detachably mounting said handle thereon and comprising an elongate body section, retainer means integrally formed at one end of said body section engageable with the ribs on said stem for releasably locking said stem and handle against rotation relative to said clip, and stem engaging means integrally formed on said body section and spaced from said retainer means for at least partially surrounding said stem at a location adjacent said handle for restraining said stem against transverse displacement relative to said clip, said stem engaging means engaging said handle shoulder for restraining said handle and stem against axial displacement relative to said clip when said ribs are engaged by said retainer means.

8. A clip as defined in claim 7 wherein said clip is formed from a length of wire with said body section comprising a generally vertically disposed intermediate section of said length of wire having said retainer means at its lower end and said stem engaging means at its upper end, said retainer means comprising a downwardly opening first U-shaped section integral with and laterally offset from said body section and proportioned to seat the legs of said first U-shaped section respectively against the backs of said ribs with the back of said first U-shaped section seated against the front of said stem, said stem engaging means comprising a second U-shaped section integral with said body section, said first U-shaped section lying in a general plane offset with respect to that of said second U-shaped section to resiliently bias said stem against the bight of said second U-shaped section when said stem and ribs are seated in said first U-shaped section.

9. A clip as defined in claim 8 wherein the spacing between said first U-shaped section and said second U-shaped section is such that said second U-shaped section can be engaged with said stem in close juxtaposition to said handle shoulder only when said ribs are fully seated in said first U-shaped section.

* * * * *